Figure 1:
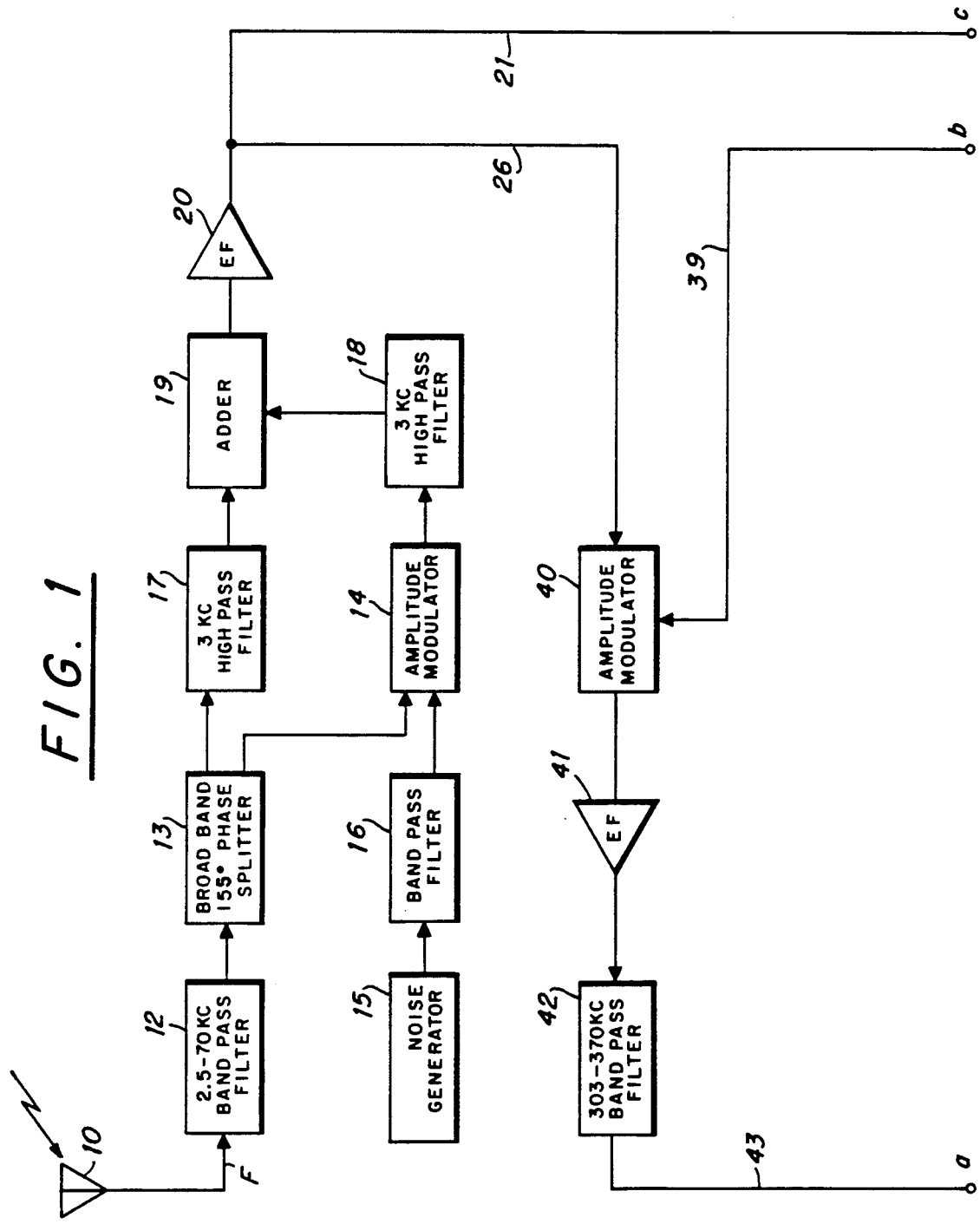

United States Patent [19]

Geren et al.

[11] Patent Number: 5,062,083
[45] Date of Patent: Oct. 29, 1991

[54] PING ELONGATOR-MODULATOR FOR REALISTIC ECHO SYNTHESIS

[75] Inventors: Keith E. Geren; Claude C. Routh, both of San Diego, Calif.

[73] Assignee: The United States of America as represented by the Secretary of the Navy, Washington, D.C.

[21] Appl. No.: 465,832

[22] Filed: Jun. 15, 1965

[51] Int. Cl.⁵ .............................................. H04K 3/00
[52] U.S. Cl. ............................................ 367/1; 434/6
[58] Field of Search ...................... 340/2, 3, 3 E, 5 D, 340/5; 343/18, 18 E; 35/10.4; 343/17.7; 367/1; 434/6

[56] References Cited

U.S. PATENT DOCUMENTS 2,721,987 10/1955 Richard ................................ 367/101
2,887,671 5/1959 Frankel et al. .......................... 367/1
2,962,964 11/1960 Batchelder .......................... 367/102
2,975,396 3/1961 Mueller .................................... 367/1

Primary Examiner—Daniel T. Pihulic
Attorney, Agent, or Firm—Harvey Fendelman; Thomas Glenn Keough; Truman L. Styner

[57] ABSTRACT

A Sonar decoy system receives an interrogating pulse from an energy source and then distorts, elongates, amplifies, and retransmits the pulse to simulate an echo of that pulse rebounding from the various reflecting surfaces of a moving submarine. To refine the allusion of an actual echo, a portion of the pulse signal is circulated and recirculated through a delay line several times, and then reinserted into the outgoing signal to contribute random additions to and phase cancellations of the various frequency components of the signal.

5 Claims, 4 Drawing Sheets

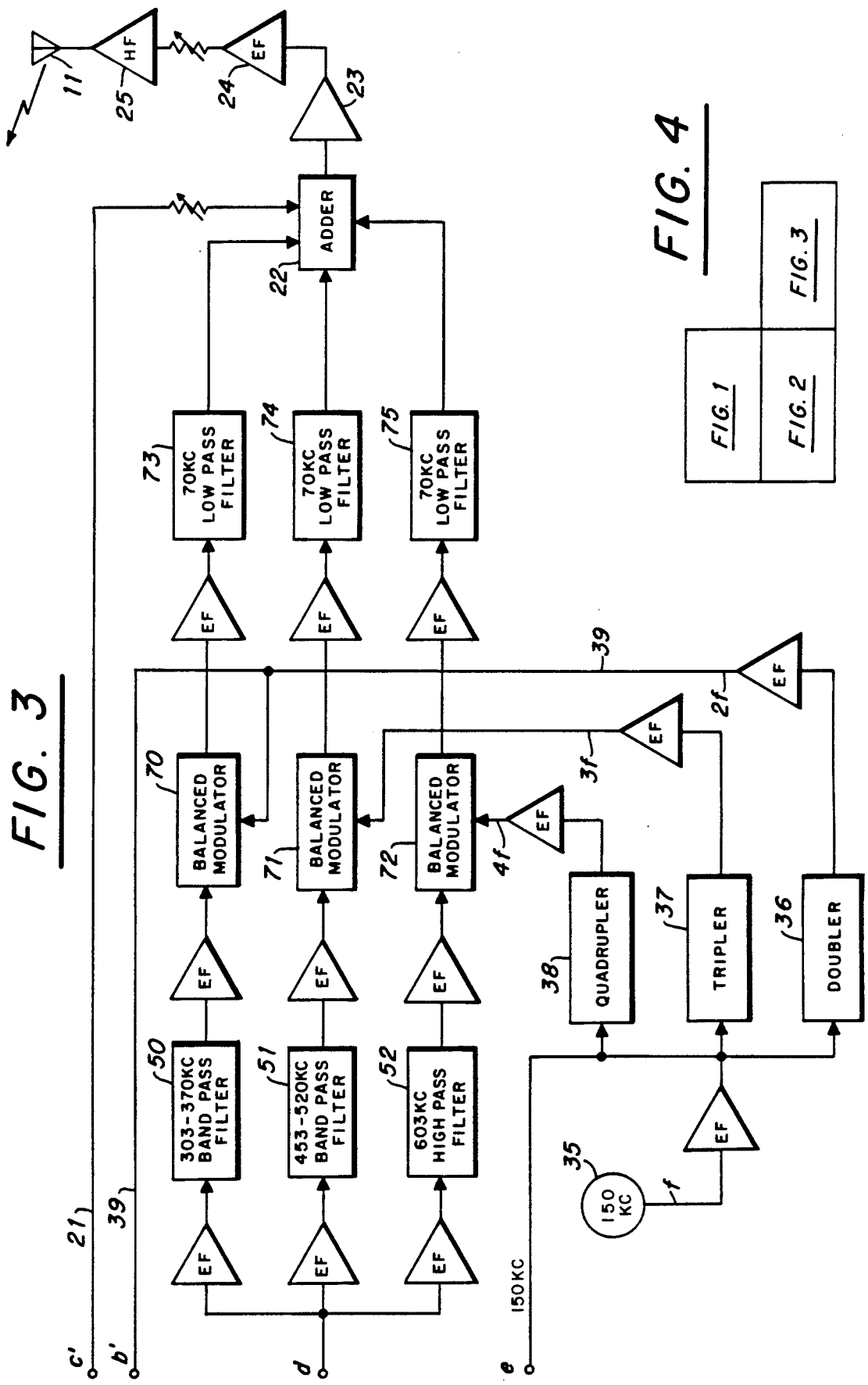

PING ELONGATOR-MODULATOR FOR REALISTIC ECHO SYNTHESIS

The invention described herein may be manufactured and used by or for the Government of the United States of America for governmental purposes without the payment of any royalties thereon or therefor.

This invention relates to sonar target simulators of the type which can receive sonar pings and modify and re-radiate the ping signals so as to simulate sonar echo signals bounced from a moving target.

The object of this invention is to provide an improved sonar target simulator.

The generation of a signal which when aurally detected and presented on a display screen is indistinguishable even to an experienced operator from a genuine echo signal has obvious tactical uses. A generator for such purposes can be employed in equipment for training sonar operators or can be employed in an anchored or moving repeater for decoying the enemy.

A sonar pulse or ping when bounced off a side of a ship is elongated. The elongation of a ping caused by the reflection from a submarine hull varies roughly as the cosine of its aspect angle as a target. As expected the minimum elongation of the ping is noted when the submarine is illuminated broadside, and the elongation increases to a maximum where the target vessel stands at about 12° from the bow or stern line. Next, the problem of simulating a convincing echo signal as to shape is complicated by the random changes of "highlights" from different reflecting surfaces of the moving target. The echo ping, understandably, has a ragged appearance because of the phase cancellations and additions as well as the varied target strength of the sources. Also, the surfaces and inner compartments of a submarine very widely in their reflecting ability and also in the sound travel time to reach them. That is, the acoustic return from a moving ship must account for all the varying amplitude and phase relations from the different portions of the target.

It is accordingly another object of this invention to provide a generating system for simulating the above mentioned amplitude and phase modulations of the ping signal reflected from a moving ship.

The objects of this invention are attained by first modulating the received ping signals with a selected band of noise from a white noise source to give the received signals the gross random character of reflections from the rough sides of a ship at an approximate angle of 12° from beam aspect. The received signal is modulated in both phase and amplitude, the percentage of modulation in both cases being about equal. These modulated signals are passed through filters having the characteristics to selectively pass all the frequencies of the received signal, and the filter output is re-radiated directly without further modification. A second signal path is provided between the output of the white noise modulator and the radiator, including a time delay network for randomly and grossly distorting the radiated signal bursts. To further refine the illusion of a genuine echo signal, the signal in the second path is recirculated two or more times through the delay network, the signal after each recirculation being added to the output signals. In the embodiment described, the feedback circuits coupled from the output to the input of the delay line include means for heterodyning to different frequencies during each recirculation of the signal through the delay line to prevent regenerative ringing and instability.

Figure 2:
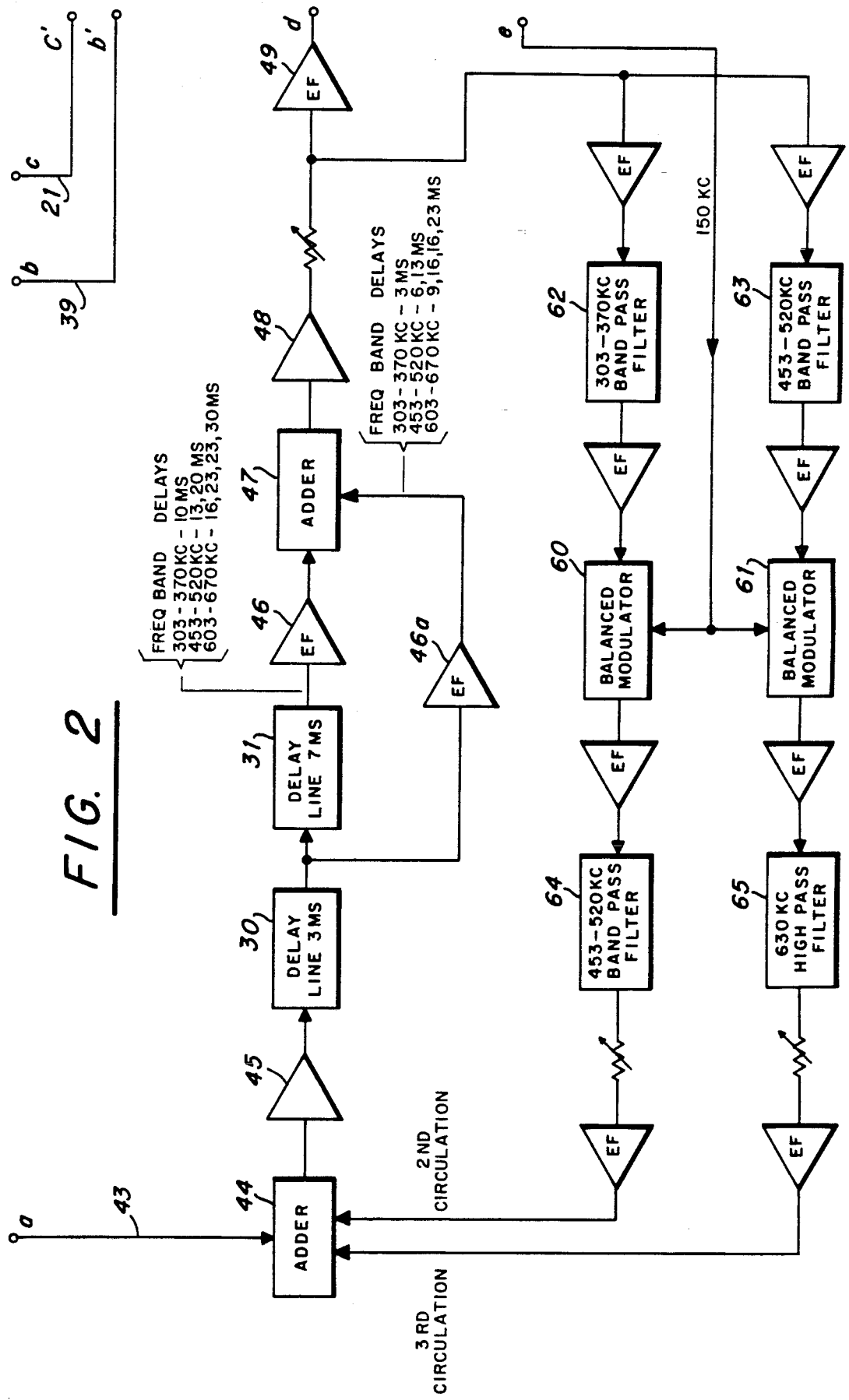
Figure 5:
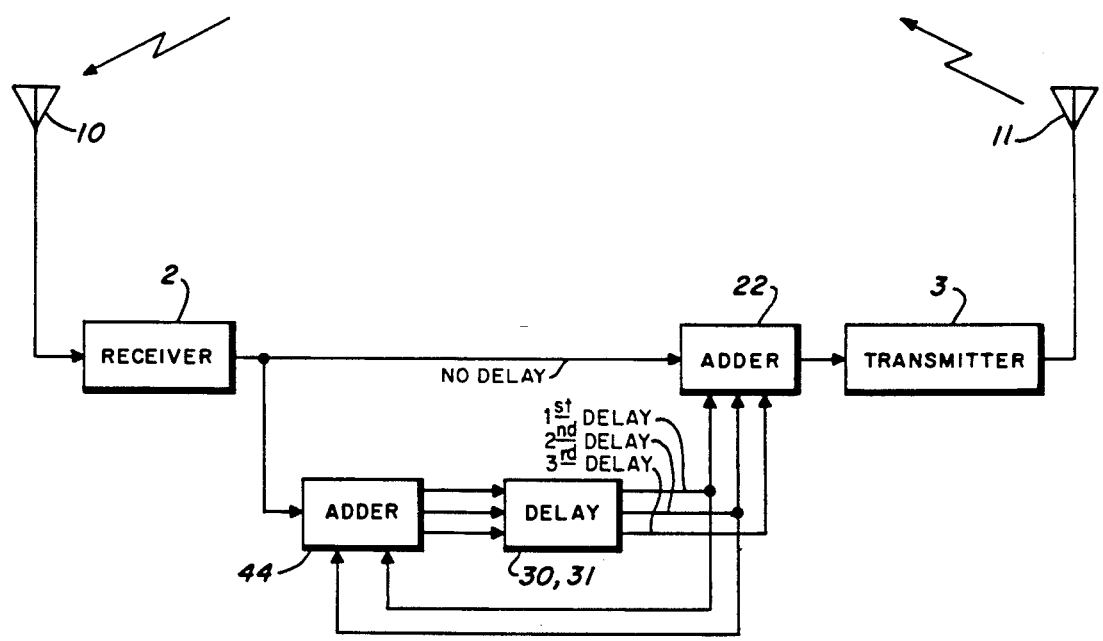

Other objects and features of this invention will become apparent to those skilled in the art by referring to the specific embodiment described in the following specification and shown in the accompanying drawing in which:

FIGS. 1, 2 and 3, when arranged side by side as shown in FIG. 4 show in block diagram one complete decoy system of this invention. FIG. 5 shows an information flow diagram of the system illustrated in FIGS. 1, 2, and 3.

The sonar signal radiated by an unfriendly source is picked up by the hydrophone 10 in FIG. 1 and after processing in the system of this invention is re-radiated from the transducer 11 in FIG. 3. In general, the signals pass as shown in FIG. 5 directly through receiver 2 and transmitter 3, a portion of the signal being routed through delay lines 30, 31 and reinserted in the outgoing signal in adder 22, the delayed portions of the signal is recirculated two or more times through the delay line, as will appear below. Typically, the system could be anchored underwater in strategic locations. The received signal will normally comprise pings or bursts of acoustic energy of frequency F. For convenience only, it can be assumed that the frequency F lies in the 3 to 70 kilocycle per second range, and reference to those figures will be made through the following specification. This frequency F may or may not be given a doppler shift frequency component to simulate relative motion between the repeater of this invention and the signal source.

The upper and the lower cut-off frequency of the bandpass filter 12 is selected to accept and pass the entire spectrum within which enemy signals may be expected. At 13 the received frequency F is phase split to produce two signals of frequency F but of different phases. One phase is passed through the high pass filter 17 to the adder 19 and hence to the emitter follower 20. The other phase is applied to the amplitude modulator 14 and is modulated by random noise generator 15 including in its output the band pass filter 16. The output of amplitude modulator 14 is also passed through a high pass filter 18 and is added to the output of filter 17 in adder 19. According to this invention it is preferred that the phase displacement between the two outputs of phase splitter 13 is about 155° and that the output of the noise generator be selected in the 10 to 100 cycle per second band. In operation it has been found that if one of the phases is amplitude modulated and then added vectorially to the other phase in adder 19, the output of adder 19 will include frequency F modulated about equal amounts in both amplitude and phase by the noise generator 15. The result at the output of the emitter follower 20 is the original signal with the gross changes in amplitude and phase which will be expected from the side of a moving submarine.

Through line 21 the phase and amplitude modulated signal is applied to the adder 22, FIG. 3, and hence through the broad band amplifier 23, emitter follower 24 and high frequency high power amplifier 25 to the transmitting transducer 11. Another portion of the output signal of the emitter follower 20 is taken off by line 26 and is delayed randomly in the delay networks 30 and 31 of FIG. 2 before it is applied in adder 22 to the transducer output of the system. The signal of line 26 is recirculated through delay lines 30 and 31, one, two or more times. If, for example, the two delay lines 30 and 31 have delays, respectively, of numerically unrelated amounts such as 3 milliseconds and 7 milliseconds, and if the signals at the output of both lines are fed back to the input of the first line, then the signal output of the two lines can be combined to produce many delays. With only three recirculations through the 3-7 millisecond lines of FIG. 2, delays of 3, 6, 9, 10, 13, 16 and 23 and 30 milliseconds are easily obtained. The signal of line 26 with all these delay components are linearly added in adder 22, FIG. 3, and are transmitted from the transducer 11. The composite signal where received and aurally detected and displayed on the screen of a sonar system, is indistinguishable from the echo return from an actual maneuvering submarine.

Unique heterodyning techniques are employed to separate the various recirculation signals through the delay lines. To this end the local oscillator 35 generating frequency f is provided. The output of the oscillator is employed directly in one heterodyning operation, and is doubled, tripled and quadrupled in frequency at 36, 37 and 38 to heterodyne, respectively, different portions of the signal in the recirculating delay portions of the system. Undesired side bands (heterodyne products) tend to develop in this type system. It will be shown how this choice of frequencies cause these products to occur at zero frequency and so be ineffective. The signal of line 26 is modulated in the balanced modulator 40 with the frequency 2f on line 39 from the doubler 36. The output of the modulator is amplified in the emitter follower 41 and the upper side band is selected in the band pass filter 42. The selected side band is applied through line 43 to the adder 44, FIG. 2, and is amplified at 45 before application to the delay lines 30 and 31. The output of the delay lines are applied, respectively, to emitter followers 46 and 46a, the two differently delayed signals being recombined in adder 47. Amplifier 48 is followed by emitter follower 49 which provides the necessary low impedance to couple in multiple to the band pass filters 50, 51 and 52. The filters 50, 51 and 52 separate into different circuits, the various side band components produced in the recirculating paths around the delay lines.

The recirculating loops include balanced modulator 60 and 61 the inputs of which are coupled, respectively, to the output of amplifier 48 and to the outputs of the local oscillator 35. The frequency f of the oscillator is employed for the heterodyning oscillations at 60 and 61.

In circuit with modulator 60 is the band pass filter 62 which is tuned to pass the same band as filter 42 which is the frequency of the signal during the first traversal through the delay lines. Band pass filter 64 at the output of the modulator 60 selects, preferably, the upper side band of the new product for the second traversal through the delay lines. For the third traversal, band pass filter 63 selects the frequencies of filter 64 at the output of the delay lines. The selected frequency, further increased by frequency f in modulator 61, is now selected by the high pass filter 65 and applied again to the input of the delay line for the third traversal through the delay line. The various frequencies 2f, 3f, and 4f, added to the signal by the various modulators to separate the several delay line traversals must now be eliminated before retransmission. To this end, frequencies 2f, 3f and 4f are introduced in proper proportions in the second set of modulators 70, 71 and 72 to exactly cancel the frequencies introduced by the first set of modulators 40, 60 and 61. In the outputs of modulators 70, 71 and 72 are connected the low pass filters 73, 74 and 75, respectively, to recover the original received signal F without any of the locally generated frequencies f. The output from each filter 73, 74 and 75 is added to the signal on line 21 in adder 22 and is amplified and transmitted.

For convenience in understanding the operation of the system of this invention, specific values have been applied to the block diagram of the drawings. The local oscillator frequency f has been chosen as 150 kilocycles per second so that the multiples thereof are 300, 450 and 600 kilocycles, all of which are combined with the frequency band F of 3 to 70 kilocycles. Then, the upper side band of the product of modulator 40 will be 303 to 370 kilocycles which is selected by the filter 42. Part of the signal of this frequency, now delayed, is selected by the band pass filter 62, is increased in frequency by 150 kilocycles and the upper side band, which is 453 to 520 kilocycles, is selected by the filter 64. This new frequency is then routed again through the delay line, and after the 3 and 7 millisecond delays are selected by the filter 63, is increased again by 150 kilocycles in modulator 61 and all high frequencies of the upper side band are selected by the high pass filter 65 for the third traversal through the delay line. By appropriately subtracting 300 kilocycles, 450 kilocycles, and 600 kilocycles from the output of the delay line in modulator 70, 71 and 72 the resulting signal 3 to 70 kilocycles reappear in the outputs of filters 73, 74 and 75. The mentioned combination of frequencies and time delays are indicated in the drawing. With the randomness of amplitude and phase modulation afforded by this system it is impossible for even a skilled operator to distinguish aurally or by the signal on a cathode ray screen this output signal from the reflected signal of an actual submarine.

Many modifications may be made in the constant of this system without departing from the scope of the invention as defined in the appended claims.

What is claimed is:

1. A decoy system for simulating the elongation and shaping of sonic wave reflections from an irregular-shaped moving object which has been illuminated with energy of any frequency F within a wide band of frequencies, said system comprising;
    a receiver for said frequency F;
    a random noise generator and modulator coupled to said receiver for randomly modulating the signal of said frequency F;
    a radiating transducer;
    an amplifier, having a pass band substantially including said wide band of frequencies, connected into the input to said radiating transducer;
    a first signal path and a second signal path connected between said modulator and said amplifier, said second path including a signal delay line with a delay which is a predetermined fraction of the desired sonic wave elongation; and
    a plurality of feedback circuits coupled from the output to the input of said delay line for recirculating a plurality of times the delayed wave signals through said delay line.

2. The decoy system defines in claim 1 further comprising;
    means for heterodyning to successively different frequencies the signal during each recirculation through said delay line to prevent ringing and at the same time heterodyne unwanted products to zero frequency.

3. In the decoy system defined in claim 1;

heterodyning means including a local oscillator for generating frequency f and a plurality of multiples thereof, and a first set of modulators connected, respectively, in said plurality of feedback circuits for giving the recirculates signal a different distinct filterable frequency during each re-circulation through said delay line.

4. The decoy system defined in claim 3 further comprising;

a second set of modulators coupled between the output of said delay line and said radiating transducer;

means for adding the multiple components of said locally generated frequency, respectively, to the modulation of said second set; and low pass filters in the output circuits of the modulators of said second set to attenuate locally generated frequencies and pass only said recirculated signals.

5. A decoy system for elongating and distorting sonar ping signals of frequency F, said system comprising;

a sonar receiver with means for phase and amplitude modulating the signals of said frequency;

a transmitting transducer;

a delay line coupled between said receiver and said transducer;

a local generator of frequency f;

means coupled to said generator for generating multiples of said frequency f;

a plurality of modulators connected between the output and input of said delay line for recirculating the signal through the delay line to progressively add delay to the signal;

the output frequency f of said local generator being applied to each modulator to increase the signal to a unique frequency during each recirculation;

filters connected in cascade in the input and output circuits of each modulator to prevent ringing at any of the unique frequencies; and a plurality of heterodyning modulators, each of said heterodyning modulators being coupled to the signal output of said delay line and to an appropriate multiple of said multiple generating means to cancel the locally generated component of one of said unique frequencies;

the output of said heterodyning modulators being coupled to said transmitting transducer.

* * * * *